United States Patent [19]

Hieda

[11] Patent Number: 4,947,242
[45] Date of Patent: Aug. 7, 1990

[54] WHITE BALANCE CONTROL WITH ADJUSTING MEANS RESPONSIVE TO IMAGE BRIGHTNESS CHANGE

[75] Inventor: Teruo Hieda, Kanagawa, Japan

[73] Assignee: Canon Kabushiki Kaisha, Tokyo, Japan

[21] Appl. No.: 196,957

[22] Filed: May 20, 1988

[30] Foreign Application Priority Data

May 25, 1987 [JP] Japan ................................ 62-125819

[51] Int. Cl.⁵ .......................... H04N 9/73; H04N 9/04
[52] U.S. Cl. ......................................... 358/29; 358/41
[58] Field of Search ................... 358/29 C, 41, 43, 44, 358/48

[56] References Cited

U.S. PATENT DOCUMENTS

| | | | |
|---|---|---|---|
| 4,506,290 | 3/1985 | Hashimoto | 358/29 C |
| 4,616,253 | 10/1986 | Hashimoto et al. | 358/29 C |
| 4,679,066 | 7/1987 | Masunaga et al. | 358/29 C |
| 4,739,392 | 4/1988 | Ueda et al. | 358/29 C |

FOREIGN PATENT DOCUMENTS

| | | | |
|---|---|---|---|
| 60-218993 | 11/1985 | Japan | 358/29 C |
| 61-92091 | 5/1986 | Japan . | |
| 61-237590 | 10/1986 | Japan . | |
| 61-238191 | 10/1986 | Japan . | |
| 61-261990 | 11/1986 | Japan . | |
| 62-159593 | 7/1987 | Japan . | |

Primary Examiner—James J. Groody
Assistant Examiner—Randall S. Svihla
Attorney, Agent, or Firm—Robin, Blecker, Daley & Driscoll

[57] ABSTRACT

An image sensing apparatus comprises: a color image pickup for converting an optical image into a plurality of electrical color signals; an adjusting unit for automatically adjusting a white balance between the color signals in accordance with a color temperature of an object to be photographed at a predetermined response characteristic; and a control unit responsive to a change in the brightness information in the optical image for variably controlling the response characteristic of the adjusting unit.

15 Claims, 6 Drawing Sheets

WHITE BALANCE CONTROL WITH ADJUSTING MEANS RESPONSIVE TO IMAGE BRIGHTNESS CHANGE

BACKGROUND OF THE INVENTION

1. Field of the Invention

This invention relates to a white balance device for a video camera.

2. Description of the Related Art

Many white balance devices for video camera as in the recent years in which the video camera has become smaller in size and lighter in weight and has become popular even to home use, have been proposed for automatic adjustment of the white balance. With this automatic white balance device, the photographer, when correcting the white balance, needs only to do a simple manipulation, or no manipulation at all. From these proposals, particular mention may be made of the technique called "automatic follow-up type" that is to employ the color signal either separated from the image signal of the video camera, or produced from the color temperature sensor which is positioned outside the image pickup system to detect the color temperature of the ambient illumination on the object to be photographed in order to carry out at all times the adjustment of the white balance. Hence, the photographer is freed from the consciousness of adjusting the white balance, since the white balance is always maintained correct automatically. Thus, the automatic follow-up type white balance device is very advantageous in handling the video camera.

Such a white balance device of the type described above has, however, a problem in that, when the image is sweeping fast on the pickup device, or when the photographer, by his intention on the composition, is turning the camera vertically or horizontally (panning) or tilting it, the ratio of the color components of the above-described color signal is caused to change, so that the color of the image is also changed, being unpleasant to view. To compensate for this defect, there has been another previous proposal that the above-described color signal is processed through an electrical circuit of comparatively large time constant (for instance, about several tens of seconds), before it is used for adjustment of the white balance. The use of this technique, however, produces an alternative problem in that, because, as the electrical power source is applied, or the conditions of the camera are largely changed, for example, the lens is capped, it takes a long time to stabilize the adjusting operation, the manageability is very lowered.

SUMMARY OF THE INVENTION

This invention has been made to solve such conventional problems, and its object is to provide a white balance device which, despite occurrence of a change of the ratio of the color components resulting from the change of the situation, is able to quickly adjust the white balance.

To achieve this object, in an embodiment of the invention, the white balance device is provided with a time dependent signal generating portion for producing a time dependent signal capable of varying with time, and a variable treating portion for treating the detection signal from the color temperature detecting means on the basis of the time dependent signal from the generating portion, wherein the gain of the color signal is controlled by the signal from this variable treating portion.

The use of such construction and arrangement enables a good stability of white balance adjustment of high accuracy to be achieved even when the photographic situation changes.

Other objects and features of the invention will become apparent from the following description of embodiments thereof by reference to the drawings.

DETAILED DESCRIPTION OF THE PREFERRED EMBODIMENTS

Figure 1:
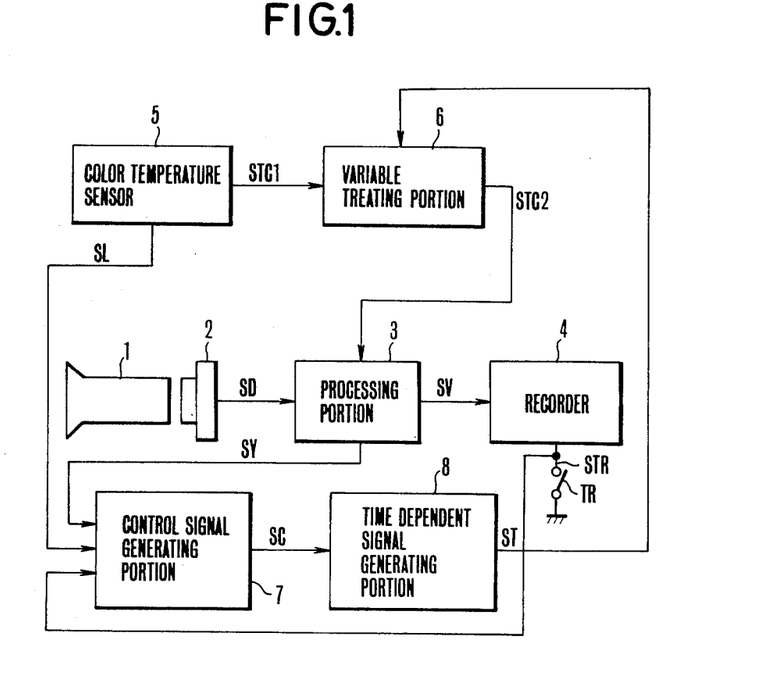
FIG. 1 is a block diagram of an embodiment of a white balance device according to the invention.

FIG. 1 in block diagram shows one embodiment of the white balance device of the invention. 1 is a photographic lens system including an optical filter and a diaphragm. 2 is an image pickup element. 3 is a processing portion for processing the luminance and chrominance of an image signal SD to produce a color television signal SV. 4 is a recorder. 5 is a color temperature sensor for detecting the color temperature of the ambient light with which an object to be photographed is illuminated to produce, for example, the R, G and B signals at the outputs of their respective sensor elements, from which a color temperature signal $STC_1$ is formed based on the formulas: log R/G and log B/G. 6 is a variable treating portion for treating the inputted color temperature signal $STC_1$ in response to an inputted time dependent signal ST. 7 is a control signal generating portion 7 for producing a control signal SC. 8 is a time dependent signal generating portion responsive to the control signal SC for producing the time dependent signal ST.

In FIG. 1, an image of the object (not shown) is formed by the lens 1 on the image plane of the image pickup element 2 in which it is photo-electrically converted to an image signal SD. In the processing portion 3, the image signal SD is separated into the luminance and chrominance signals, which are then subjected to various treatments to produce a color television signal SV. When a trigger switch TR turns on, the television signal SV is recorded in the recorder 4. Also, by the color temperature sensor 5, the color temperature of the ambient illumination light of the object to be photographed is detected, and the color temperature signal $STC_1$ is produced and applied to the variable treating portion 6.

Meanwhile, receiving camera control signals and signals from the various portions of the camera (all of which are not shown), the control signal generating portion 7 produces a control signal SC which is then applied to the time dependent signal generating portion 8. In the time dependent signal generating portion 8, on the basis of the control signal SC, a time dependent signal ST which varies with time is generated, being applied to the variable treating portion 6. In the variable treating portion 6, the color temperature signal $STC_1$ inputted from the color temperature sensor 5 is treated according to the time dependent signal ST to generate a changing-with-time color temperature signal $STC_2$. The color temperature signal $STC_2$ is supplied to the processing portion 3. The processing portion 3 controls the gain for the chrominance signal obtained from the image signal SD to adjust the white balance.

Figure 2:
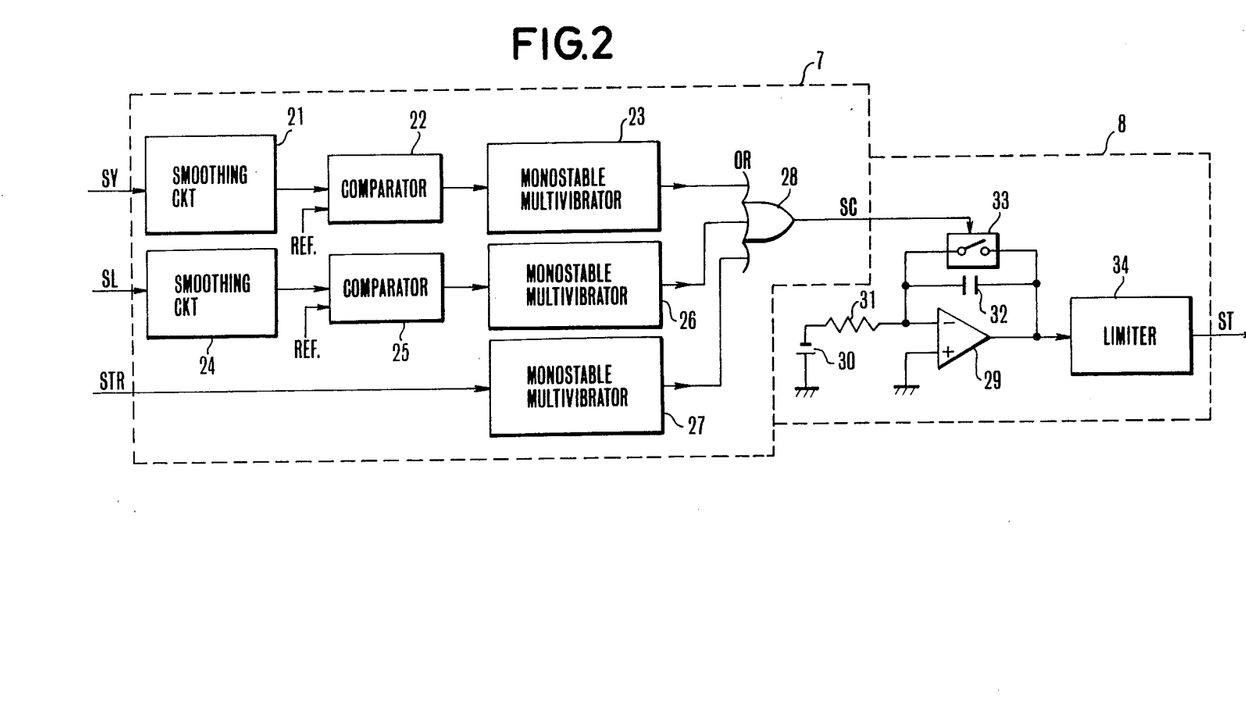
FIG. 2 is a block diagram illustrating the details of the main parts in the embodiment of FIG. 1.

FIG. 2 in block diagram shows the details of the main parts in the embodiment of FIG. 1. They comprise smoothing circuits 21 and 24, comparators 22 and 25 for comparing the inputs with the respective predetermined values, monostable multivibrators 23, 26 and 27 for converting the input signals to produce one-shot pulses of predetermined width, for example, several tens of microseconds, and an OR gate 28 constitute the control signal generating portion 7 of FIG. 1. An operational amplifier 29, a reference voltage 30, a resistor 31, a capacitor 32, a switching circuit 33 and a limiter 34 constitute the time dependent signal generating portion 8 of FIG. 1. SY is the luminance signal obtained from the processing portion 3. SL is the illumination output obtained from the color temperature sensor 5, for example, the green color output. STR is the trigger signal for image pickup produced from the trigger switch TR for controlling the recorder 4.

In the device of FIG. 2, the inputted luminance signal is smoothed by the smoothing circuit 21, and then compared with a predetermined value by the comparator 22. When a comparison output produced by the comparator 22 changes, the monostable multivibrator 23 generates a one-shot pulse. Such one-shot pulse enters the OR gate 28. Another input, or the illumination output SL, is processed in a similar way through the smoothing circuit 24, comparator 25 and monostable multivibrator 26. If the average value of the input changes largely, a one-shot pulse is produced, entering the OR gate 28. Even when the trigger signal STR for image pickup changes, the monostable multivibrator 27 produces a one-shot pulse, which is also applied to the OR gate 28. Then, all these one-shot pulses are subject to OR operation. This output of the OR gate 28 is applied as the control signal SC to the switching circuit 33. When the switching circuit 33 is closed and maintained in the closed state for a time equal to the width of the one-shot pulse, the poles of the capacitor 32 are short-circuited and the potential difference across them disappears. From this time onward, a current determined by the reference voltage 30 and the resistor 31 is being integrated on the capacitor 32. Therefore, the output of the operational amplifier 29 rises with time. This variation of the output of the operational amplifier 29 takes a period of, for example, several tens of seconds. This output is limited to a predetermined value by the limiter 34 to be produced as the time dependent signal ST.

Figure 3:
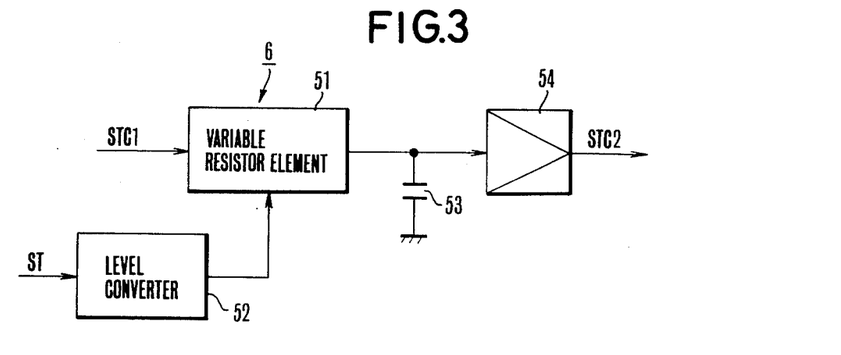
FIG. 3 is a block diagram of a practical example of the variable treating portion in the embodiment of FIG. 1.

FIG. 3 in block diagram shows a practical example of the variable treating portion 6 in the embodiment of FIG. 1. A variable resistor element 51 has a resistance value variable depending on the control signal applied thereto from a level converter 52. 53 is a capacitor. A buffer amplifier 54 of high impedance has its input stage constituted an FET or the like. The time dependent signal ST is varied by the level converter 52 to a value suited to the control characteristic for the variable resistor element 51, and is applied to the control terminal of the variable resistor element 51. The variable resistor element 51 is controlled in such a manner that when the level of the time dependent signal ST is low, the value of resistance becomes small. Also, the first color temperature signal $STC_1$ is applied through the variable resistor element 51 to, and integrated on, the capacitor 53 in the form of charges, and then amplified by the buffer amplifier 54 to be produced as the secondary color temperature signal $STC_2$.

Now assuming that the color temperature signal $STC_1$ varies, then the color temperature signal $STC_2$ varies according to the time constant formed by the resistance value of the variable resistor element 51 and the value of the capacitor 53, finally reaching the same value as the color temperature signal $STC_1$ which has varied. The required time for this course varies as a function of the resistance value of the variable resistor element 51, that is, the value of the time dependent signal ST.

Figure 4:
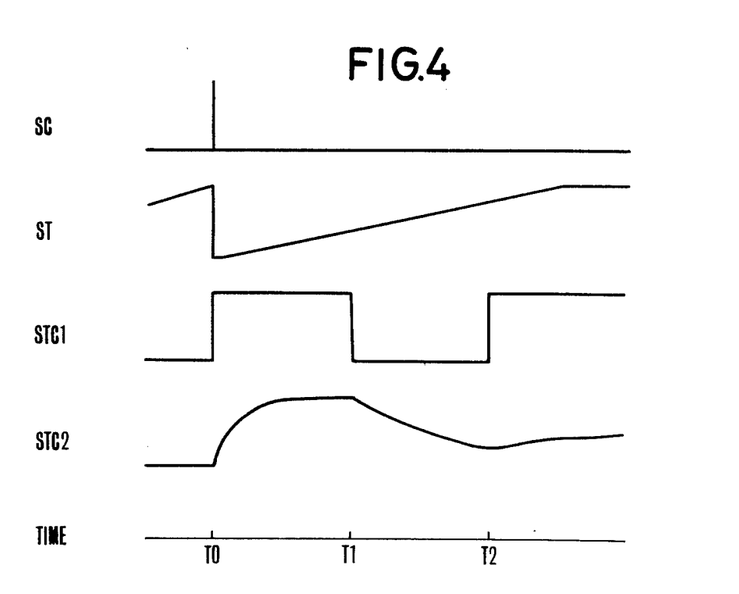
FIG. 4 is a timing chart illustrating a manner in which the embodiment of the invention operates.

FIG. 4 is a timing chart taken to explain the operation of the embodiment of the invention. In the case when the brightness is high, or when the recording trigger is actuated, at a time $T_0$ just after that, the time dependent signal ST is minimized. Thereby the resistance value of the variable resistor element 51 becomes low, and the time constant becomes short. Hence, the color temperature signal $STC_2$ can reach relatively fast the same value as that of the first color temperature signal $STC_1$. At another time $T_1$, the color temperature signal $STC_1$ varies again. For this case, however, the time dependent signal ST is higher than at the time $T_0$, or the time constant is longer than at the time $T_0$. Therefore, the time necessary for the color temperature signal $STC_2$ to reach the color temperature signal $STC_1$ becomes long. At a further later time $T_2$, the time dependent signal ST is even higher, and the time constant is even larger. Therefore, while the color temperature signal $STC_1$ has rapidly varied anew, the color temperature signal $STC_2$ varies very slowly. In such a manner, for the case of a large change of the photographic condition, it is just after it that the white balance is controlled by quick response. As the time goes on, the response gradually slow down. Hence, it becomes possible to control the white balance with high accuracy.

Figure 5:
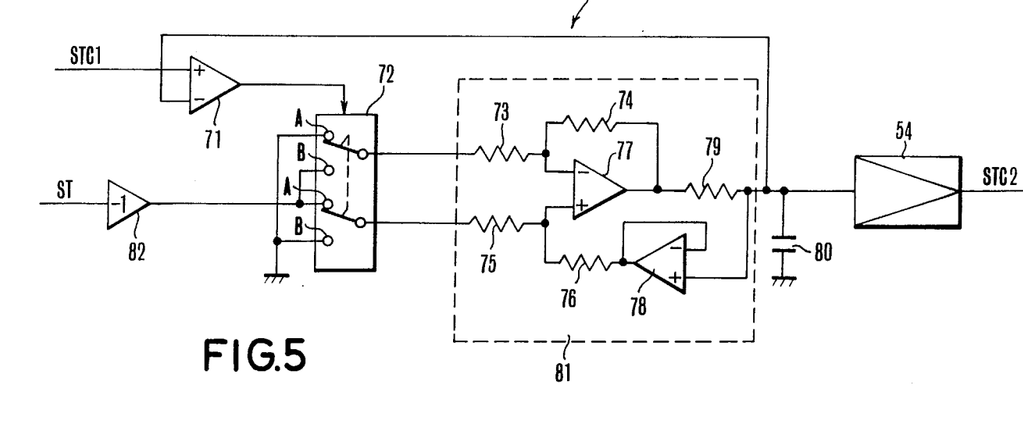
FIG. 5 is a block diagram of another practical example of the variable treating portion.

FIG. 5 in block diagram shows another practical example of the variable treating portion 6 of the invention, comprising a comparator 71, a switching circuit 72, resistors 73, 74, 75, 76 and 79, operational amplifiers 77 and 78, a capacitor 80 and an inversion amplifier 82. The operational amplifiers 77 and 78 and the resistors 73, 74, 75 and 76 constitute a constant current source 81 whose output current is changed over between the two polarities by the switch 72. The color temperature signal $STC_1$ is compared with the voltage of the capacitor 80 by the comparator 71. By a comparison output of the comparator 71, the switching circuit 72 is changed over. The constant current source 81 flows current out or in depending on the polarity of the switching circuit 72 and the time dependent signal ST. This current is integrated by the capacitor 80. Such integrated value is amplified by the buffer amplifier 54 to be produced as the color temperature signal $STC_2$. When the voltage of the capacitor 80 is smaller than the color temperature signal $STC_1$, the comparator 71 sets the switch 72 in a position where the current flows to the capacitor 80. Conversely when it is larger than the color temperature signal $STC_1$, the comparator 71 moves the switch 72 to another position in which the current flows out of the capacitor 80. Accordingly, in final, form the output or the color temperature signal $STC_2$ becomes almost equal to the first color temperature signal $STC_1$. The time from the moment at which the color temperature signal $STC_1$ has started to change to a moment at which such an event occurs is controlled by the time dependent signal ST. When the time dependent signal ST is small, the current which the constant current source 81 produces is large, and it takes only a short time. But, when the time dependent signal ST becomes large, the constant current source 81 produces a small current, and a long time is required. It should be noted that in order to stabilize the operation, a window comparator may be used in place of the comparator 71 when the flowing-in, holding and flowing-out operations are performed. Also, that window comparator may be made variable by the time dependent signal ST.

Figure 6:
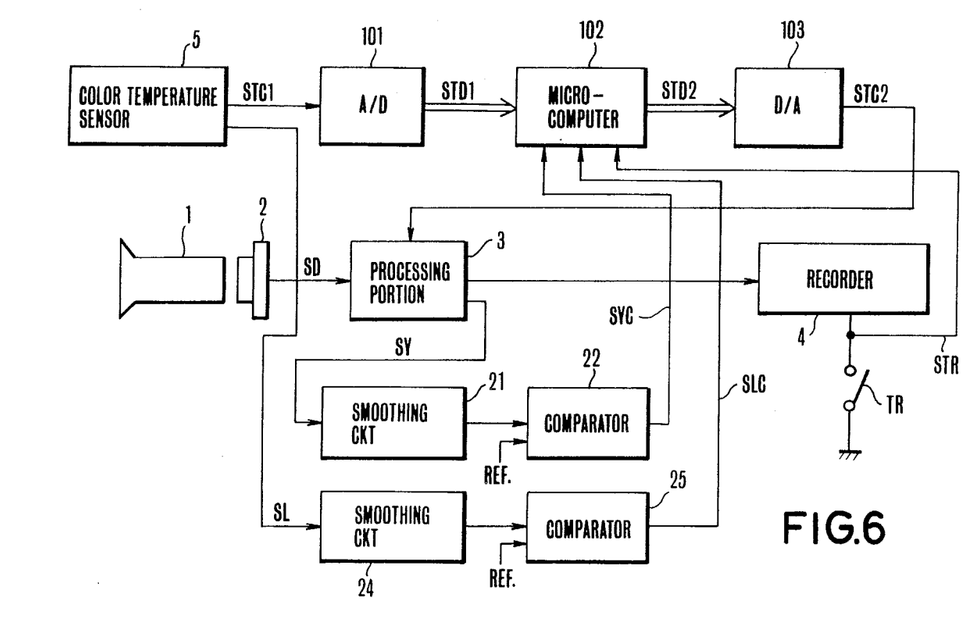
FIG. 6 is a block diagram of another embodiment of the white balance device according to the invention.

FIG. 6 is a block diagram of another embodiment of the white balance device according to the invention, in which 101 is an A/D converter, 102 is a microcomputer, and 103 is a D/A converter, and the same reference characters as those of FIGS. 1 and 2 denote the same or like parts.

Figure 7:
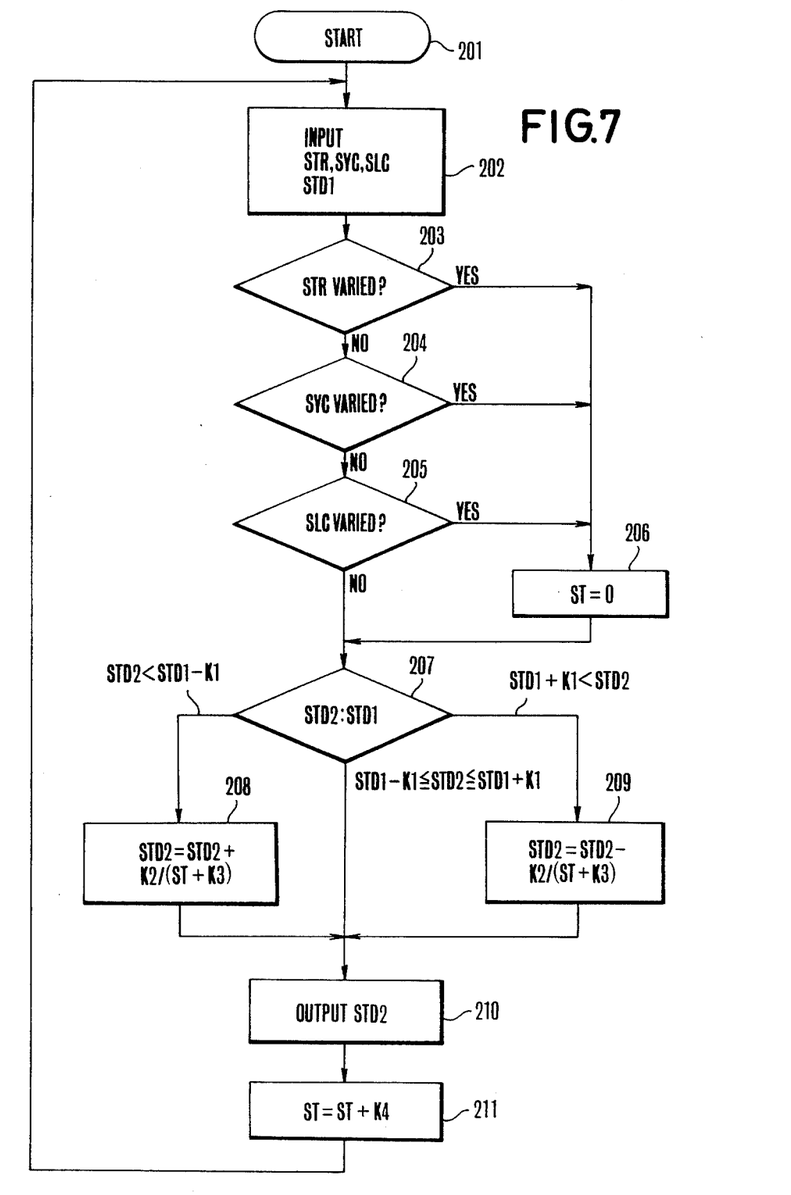
FIG. 7 is a flowchart illustrating the operations of the microcomputer in FIG. 6.

The output of the color temperature sensor 5 or the color temperature signal $STC_1$ is applied to the A/D converter 101 in which it is converted to a digital signal $STD_1$ which is then applied to the microcomputer 102. Also, the luminance signal SY is smoothed by the smoothing circuit 21, then compared with the predetermined value by the comparator 22, and then applied as a signal SYC to the microcomputer 102. Further, the illumination output SL of the color temperature sensor 5 is smoothed by the smoothing circuit 24, then compared with a predetermined value by the comparator 25, and then applied as a signal SLC to the microcomputer 102. The microcomputer 102 receptive of the input signals or the image pickup trigger signal STR and the signals SYC and SLC controls the digital signal $STD_1$ to produce a digital signal $STD_2$. The D/A converter 103 converts the digital signal $STD_2$ to analog form. Thus, the color temperature signal $STC_2$ is produced, based on which the processing portion 3 is controlled to adjust the white balance FIG. 7 is a flowchart for the operation of the microcomputer 102 in FIG. 6.

It begins with a step 201. At first, in a step 202, all the inputs are taken in. Then, whether or not any one of the signals STR, SYC and SLC has varied from the previous value is tested by comparison in respective steps 203, 204 and 205 successively. If so, then set ST=0 in a step 206. Otherwise advance to a step 207 without further alteration in which the digital signal $STD_2$ is compared with the digital signal $STD_1$. That is, if $$STD_2 < STD_1 - K_1 \text{(where } K_1\text{: constant)}$$

then the digital signal $STD_2$ is increased by a step 208 based on the formula:

$$STD_2 = STD_2 + K_2/(ST + K_3) \text{ (where } K_2, K_3: \text{ constant)}$$

If $$STD_1 - K_1 < STD_2 < STD_1 + K_1,$$

then the signal $STD_2$ is left unchanged. If $$STD_1 - K_1 < STD_2,$$

then the signal $STD_2$ is decreased by a step 209 based on the formula:

$$STD_2 = STD_2 - K_2/(ST + K_3)$$

In the next step 210, the digital signal $STD_2$ obtained from either one of these steps is placed onto its output. In a step 211, ST is increased based on the formula:

$$ST = ST + K_4 \text{(where } K_4\text{: constant)}$$

It also may be made that ST does not increase beyond a predetermined value. According to the above control, when any one of the signals STR, SYC and SLC has ever varied, the response can be sped up, or when there is no variation, the response can be gradually slowed down.

Though the foregoing embodiments each have been described as applied to the type using the color temperature sensor, the invention is not confined thereto. It is to be understood that the invention is applicable to any other types provided the white balancing is carried out at any times in the control signal line of the means for controlling the gain of the color signal.

As has been described above, according to the invention, a stable, high accuracy white balance device can be realized.

What is claimed is:

1. An image sensing apparatus comprising:
   (a) color image pickup means for converting an optical image into a plurality of electrical color signals;
   (b) adjusting means for automatically adjusting a white balance between said color signals in accordance with a color temperature of an object to be photographed at a predetermined response characteristics; and
   (c) control means responsive to a change in brightness information of the object for variably controlling said response characteristic of said adjusting means.

2. An apparatus according to claim 1, wherein said adjusting means includes color temperature detecting means for detecting the color temperature of the object.

3. An apparatus according to claim 2, wherein said color temperature detecting means includes a plurality of sensors for detecting different colors.

4. An apparatus according to claim 1, wherein said control means varies said response characteristic when the brightness information of the object exceeds a predetermined level.

5. An apparatus according to claim 1, wherein said control means detects the brightness information of the object based on a luminance signal component included in an output of said color image pickup means.

6. An apparatus according to claim 1, wherein said control means controls said response characteristic such that at first said response characteristic is fast, and after that, said response characteristic slows down gradually.

7. An image sensing apparatus according to claim 1, further including recording means for processing and recording the color signals produced from said image pickup means.

8. An image sensing apparatus comprising:

(a) color image pickup means for converting an optical image into a plurality of electrical color signals;
(b) adjusting means for automatically adjusting a white balance between said color signals in accordance with a color temperature of an object to be photographed at a predetermined response characteristic; and
(c) control means responsive to a change in the brightness information in said optical image for controlling said response characteristic of said adjusting means such that said response characteristic is once fast, and then gradually slows down.

9. An apparatus according to claim 8, wherein said adjusting means includes color temperature detecting means for detecting the color temperature of the object.

10. An apparatus according to claim 9, wherein said color temperature detecting means includes a plurality of sensors for detecting different colors.

11. An image sensing apparatus according to claim 8, further including recording means for processing and recording the color signals produced from said image pickup means.

12. An image sensing apparatus comprising:
(a) color image pickup means for converting an optical image into a plurality of electrical color signals;
(b) adjusting means for automatically adjusting a white balance between said color signals in accordance with a color temperature of an object to be photographed at a predetermined response characteristic;
(c) recording means for processing and recording the color signals produced from said image pickup means; and
(d) control means for variably controlling said response characteristic of said adjusting means in relation to a recording operation of said recording means, said control means controlling said response characteristic such that at first said response characteristic is fast, and after that, said response characteristic slows down gradually.

13. An apparatus according to claim 12, wherein said adjusting means includes color temperature detecting means for detecting the color temperature of the object.

14. An apparatus according to claim 13, wherein said color temperature detecting means includes a plurality of sensors for detecting different colors.

15. An apparatus according to claim 12, wherein said control means varies said response characteristic in response to a change of brightness information of the object.

* * * * *

UNITED STATES PATENT AND TRADEMARK OFFICE
CERTIFICATE OF CORRECTION

PATENT NO. : 4,947,242

DATED : August 7, 1990

INVENTOR(S) : Teruo Hieda

It is certified that error appears in the above-identified patent and that said Letters Patent is hereby corrected as shown below:

Col. 1, line 11, Change "camera" to -- cameras --

Col. 3, line 50, Change "poles" to -- plates --

Col. 4, line 45, Change "slow" to -- slows --

Col. 5, line 3, Change "in final, form" to -- in final form, --

Col. 5, line 67, Change "$\leqq$" to -- $\leq$ -- both instances.

Col. 6, line 3, Change " - " to -- + --

Signed and Sealed this

Thirty-first Day of March, 1992

Attest:

HARRY F. MANBECK, JR.

*Attesting Officer*   *Commissioner of Patents and Trademarks*